United States Patent
Saitoh et al.

(10) Patent No.: US 8,186,823 B2
(45) Date of Patent: May 29, 2012

(54) INKJET RECORDING METHOD AND INKJET RECORDING APPARATUS

(75) Inventors: Haruki Saitoh, Miyagi (JP); Hijiri Ogata, Miyagi (JP)

(73) Assignee: Tohoku Ricoh Co., Ltd., Shibata-gun (JP)

( * ) Notice: Subject to any disclaimer, the term of this patent is extended or adjusted under 35 U.S.C. 154(b) by 476 days.

(21) Appl. No.: 12/468,437

(22) Filed: May 19, 2009

(65) Prior Publication Data

US 2009/0290007 A1    Nov. 26, 2009

(30) Foreign Application Priority Data

May 20, 2008  (JP) .................................. 2008-132446

(51) Int. Cl.
*B41J 2/01* (2006.01)
(52) U.S. Cl. ...................................................... 347/102
(58) Field of Classification Search .................. None
See application file for complete search history.

(56) References Cited

U.S. PATENT DOCUMENTS

| | | | |
|---|---|---|---|
| 2005/0024458 A1* | 2/2005 | Sanada et al. ................. | 347/100 |
| 2005/0123696 A1* | 6/2005 | Campbell et al. .......... | 428/32.34 |

FOREIGN PATENT DOCUMENTS

| | | |
|---|---|---|
| EP | 1 029 702 A2 | 8/2000 |
| JP | 6-73951 | 9/1994 |
| JP | 2893259 | 3/1999 |
| JP | 2003-301711 | 10/2000 |
| JP | 3136647 | 12/2000 |
| JP | 2003-311940 | 11/2003 |
| JP | 2003-534164 | 11/2003 |
| JP | 2004-90596 | 3/2004 |
| JP | 2004-114691 | 4/2004 |
| JP | 2007-331171 | 12/2007 |
| JP | 2008-68462 | 3/2008 |
| WO | WO 92/05957 | 4/1992 |
| WO | WO 01/89835 A2 | 11/2001 |

OTHER PUBLICATIONS

Office Action issued Dec. 17, 2010, in German Patent Application No. 10 2009 022 220.0-45 (with English Translation).

* cited by examiner

*Primary Examiner* — Stephen Meier
*Assistant Examiner* — Alexander C Witowski
(74) *Attorney, Agent, or Firm* — Oblon, Spivak, McClelland, Maier & Neustadt, L.L.P.

(57) ABSTRACT

An inkjet recording method including: (i) exposing a surface of a recording medium to non-thermal atmospheric pressure plasma so as to hydrophilize the surface of the recording medium, and (ii) applying a stimulus to an ink composition so as to eject the ink composition to form an image on the recording medium, wherein the ink composition contains at least one of a pigment/water-dispersible resin particle mixture in which a pigment is dispersed along with water-dispersible resin particles and colored water-dispersible resin particles each of which is a water-dispersible resin particle which is colored.

6 Claims, 1 Drawing Sheet

INKJET RECORDING METHOD AND INKJET RECORDING APPARATUS

BACKGROUND OF THE INVENTION

1. Field of the Invention

The present invention relates to an inkjet recording method and inkjet recording apparatus.

2. Description of the Related Art

An inkjet recording method is a method for recording images or the like, in which small liquid drops of ink are jetted and attached to a recording medium such as paper. In the inkjet recording method, an ink composition is generally used which contains various colorants such as dyes and pigments dissolved in water or a mixture of water and organic solvent, and a large quantity of wetting agents consisting of organic solvents having a high boiling point.

In the inkjet recording method, as a recording medium, a recording medium having poor water-absorbing capacity such as commonly used plain paper is sometimes used, in place of an inkjet-dedicated paper excellent in water absorbability. These recording media do not necessarily have an absorbing layer. Accordingly, it is hard for an ink to permeate into the recording medium, so that drying thereof is a time-consuming process.

For example, in a high-speed automatic duplex printing, a one-surface-printed paper is promptly reversed and subjected to the back face printing in an inkjet recording apparatus, which tend to cause a problem that reversal rollers are stained with undried ink.

Meanwhile, when the ink adhesion amount is increased for the purpose of increasing an image density, more time is needed for drying, and image quality tends to degrade due to the feathering of the image.

Accordingly, an inkjet recording method has been demanded which enables to quickly dry ink and produce images of high image density and high quality even when a plain paper is used.

Japanese Patent Application Laid-Open (JP-A) Nos. 2003-534164 and 2004-114691 disclose a method of heating and drying ink during printing process or after the printing process. However, if ink heating is performed during printing process or the like, an inkjet head tends to be deformed by heat, resulting in the degradation of injection stability such as nozzle clogging.

Moreover, if heat enough for drying the ink is applied to the paper, water contained in the paper is also evaporated, to thereby make the paper wavy. In some cases, the paper is even damaged by drying.

JP-A No. 2008-68462 discloses that a preheating process is performed before a printing process to lower the amount of moisture in a paper, so as to shorten the drying time after printing. However, such a heating tends to overdry the fibers of paper and shrinks them, resulting in the waving of the paper. Further, the paper waving becomes more noticeable with partial swelling of the paper fibers due to the absorption of ink, causing excess elevation of humidity in the apparatus.

Furthermore, when the paper waves, an ink ejecting distance directly under the inkjet head varies with the move of the paper, resulting in the occurrence of unevenness in the color image formed by overlapping a plurality of colors.

JP-A No. 2003-311940 discloses a technique for forming images by applying a UV curable ink onto a recording medium whose wettability is improved by a plasma treatment.

JP-A No. 2000-301711 discloses an inkjet-dedicated paper reformed with plasma and having an ink-receptive layer.

JP-A No. 2004-90596 discloses a technique for inkjet recording, in which an ink hardening component was applied onto a recording medium in advance, and ink containing the hardening component is used for the inkjet recording. To apply the hardening component uniformly, the surface of the recording medium is treated with plasma.

BRIEF SUMMARY OF THE INVENTION

The object of the present invention is to provide an inkjet recording method and an inkjet recording apparatus, which solve the above conventional problems, and can produce a high-density, high quality image with high drying speed.

To solve the above-mentioned problems, the present inventors have conducted extensive studies. As a result, they have found that a recording medium whose surface is hydrophilized by exposing the surface to non-thermal atmospheric pressure plasma does not undergo any deformation such as waving due to the shrink of paper fiber, and has a high water-absorption property; and that if an ink composition containing at least one of a pigment/water-dispersible resin particles mixture in which a pigment is dispersed along with a water-dispersible resin particles and a colored water-dispersible resin particles is used to record (print) images or the like on the hydrophilized recording medium, a high density, high quality images can be obtained with at a high drying speed, leading to the accomplishment of the present invention.

The present inventors also found that such a hydrophilized recording medium as mentioned above tend to lose its surface activity (hydrophilicity) with time, so that it is preferable to perform printing immediately after the hydrophilization treatment.

Means for solving the above mentioned problems has the following aspects.

<1> An inkjet recording method including: (i) exposing a surface of a recording medium to non-thermal atmospheric pressure plasma so as to hydrophilize the surface of the recording medium, and (ii) applying a stimulus to an ink composition so as to eject the ink composition to form an image on the recording medium, wherein the ink composition contains at least one of a pigment/water-dispersible resin particle mixture in which a pigment is dispersed along with water-dispersible resin particles and colored water-dispersible resin particles each of which is a water-dispersible resin particle which is colored.

In the inkjet recording method according to <1>, the surface of the recording medium is exposed to non-thermal atmospheric pressure plasma so as to hydrophilize the surface thereof, and a stimulus is applied to an ink composition containing at least one of a pigment/water-dispersible resin particle mixture in which a pigment is dispersed along with water-dispersible resin particles and colored water-dispersible resin particles each of which is a water-dispersible resin particle which is colored, and the ink composition is ejected to form images.

<2> The inkjet recording method according to <1>, wherein (i) and (ii) are successively performed.

<3> The inkjet recording method according to any one of <1> and <2>, wherein the recording medium is a plain paper.

<4> The inkjet recording method according to any one of <1> to <3>, wherein the stimulus is at least one selected from heat (temperature), pressure, vibration and light.

<5> An inkjet recording apparatus including: a hydrophilizing unit configured to expose a surface of a recording medium to non-thermal atmospheric pressure plasma so as to hydrophilize the surface of the recording medium, an ejecting unit configured to apply a stimulus to an ink composition so as to eject the ink composition to form an image on the recording medium, wherein the ink composition contains at least one of a pigment/water-dispersible resin particle mixture in which a pigment is dispersed along with water-dispersible resin particles and colored water-dispersible resin particles each of which is a water-dispersible resin particle which is colored.

<6> The inkjet recording apparatus according to <5>, wherein the recording medium is a plain paper.

<7> The inkjet recording apparatus according to any one of <5> to <6>, wherein the stimulus is at least one selected from heat (temperature), pressure, vibration and light.

According to the present invention, the conventional problems as mentioned above can be solved, and an inkjet recording method and an inkjet recording apparatus are provided, capable of obtaining images of a high drying speed, high density and high quality.

DETAILED DESCRIPTION OF THE INVENTION

[Recording Medium]

The recording medium is not particularly limited provided that it is a so-called plain paper, and may be selected appropriately depending of the purpose. Examples thereof include a sheet like material such as non-woven cloth composed mainly of wood pulp, recycled pulp, and the like.

Since the plain paper is generally not coated at both sides thereof, the feathering of an aqueous ink often occurs along the direction of fibers of the pulp exposed on the surface. In order to suppress the feathering of the aqueous ink in many cases, a sizing agent is added in an amount of about 0.1% by mass with respect to the pulp mass.

Although the addition of the sizing agent to the plain paper can suppress the feathering of an aqueous ink and enhance the image quality, it lowers the penetration speed of the aqueous ink. Thus, basically, the plain paper, as a recording medium, does not meet the quick drying requirement in an inkjet recording which takes a penetration drying method.

The plain paper containing the sizing agent generally has a Stockigt sizing degree referred to in JIS P-8122 test method of 3 seconds or more.

As the recording medium, an ordinary inkjet-dedicated paper, and a sheet-like medium which is other than a paper and water-absorbable may also be used so far as they are slow in drying an aqueous ink.

[Ink Composition]

-Colorant-

The above-mentioned colorant is not particularly limited and may be appropriately selected depending on the purpose. Preferable examples thereof include (1) a pigment/water-dispersible resin particle mixture in which a pigment is dispersed together with water-dispersible resin particles, and (2) colored water-dispersible resin particles formed of water-dispersible resin particles that are colored.

Additionally, a pigment-based ink composition may be used in which the dispersion state of the pigment is stabilized with a surfactant and a dispersant of water-soluble resin.

-Pigment/Water-Dispersible Resin Particles Mixture-

As the pigment contained in the pigment/water-dispersible resin particle mixture, it is preferable to use those whose surface is reformed such that at least one kind of a hydrophilic group binds, directly or by the intermediary of other atomic groups, to the surface of the pigment. Examples of the hydrophilic group include sulfonic group, carboxyl group and the like.

The surface reforming may be performed by chemically binding a functional group such as sulfonic group and carboxyl group to the surface of the pigment, or by a wet oxidation treatment using at least one of hypohalous acid and a salt thereof. Of these, it is preferable that a sulfonic group or a carboxylic group is bound to the surface of the pigment and the pigment is dispersed in water. The surface-reformed pigment to which a hydrophilic group is bound is excellent in dispersion stability, can provide a high-quality printing quality, and enhances water resistance of the recording medium after printing.

-Colored Water-Dispersible Resin Particles-

The above-mentioned colored water-dispersible resin particle means either a resin particle (water-dispersible resin particle) in which a pigment is included or a resin particle (water-dispersible resin particle) on which surface a pigment is adsorbed. Examples thereof include those recited in the above-mentioned JP-A No. 2001-139849. The colored water-dispersible resin particle can provide a less feathering, high-quality printing, and can improve dryness.

Next, the pigments for use in the colorant, and the water-dispersible resin particles will be explained.

The pigments used as the colorant may be an organic pigment and an inorganic pigment which are excellent in light resistance.

Examples of the organic pigment include azo-based, phthalocyanine-based, anthraquinone-based, quinacridone-based, dioxazin-based, indigo-based, thioindigo-based, perylene-based, isoindolinone-based, and azomethine-based pigment, rhodamine B lake pigment, aniline black, and carbon black.

Examples of the inorganic pigment include iron oxide, titanium oxide, calcium carbonate, barium sulfate, aluminum hydroxide, barium yellow pigment, iron blue pigment, cadmium red pigment, chrome yellow pigment, and metal powder.

Particle diameter of the pigment is preferably 0.01 μm to 0.30 μm. When the particle diameter is less than 0.01 μm, light resistance and feathering property tend to degrade because the particle diameter approaches to that of dye. When the particle diameter is more than 0.30 μm, nozzle clogging and filter clogging in the printer tend to occur and degrade inkjet stability.

As a carbon black to be used in a black pigment-based ink composition is preferably a carbon black produced by a furnace method or a channel method which has a primary particle diameter of 15 nm to 40 nm, a BET specific surface area of 50 $m^2/g$ to 300 $m^2/g$, a DBP oil absorption amount of 40 mL/100 g to 150 mL/100 g, a volatile content of 0.5% to 10%, and a pH value of 2 to 9.

Examples thereof include No. 2300, No. 900, MCF-88, No. 33, No. 40, No. 45, No. 52, MA7, MA8, MA100, No. 2200B (all produced by Mitsubishi Chemical Corporation), RAVEN 700, RAVEN 5750, RAVEN 5250, RAVEN 5000, RAVEN 3500, RAVEN 1255 (all produced by Columbian Carbon Japan, Ltd.), REGAL 400R, REGAL 330R, REGAL 660R, MOGUL L, MONARCH 700, MONARCH 800, MONARCH 880, MONARCH 900, MONARCH 1000, MONARCH 1100, MONARCH 1300, MONARCH 1400 (all produced by Cabot Corporation), COLOR BLACK FW1, COLOR BLACK FW2, COLOR BLACK FW2V, COLOR BLACK FW18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A, SPECIAL BLACK 4 (all produced by Evonik Degussa Japan). The carbon black is not limited to any of these examples.

-Color Pigment-

Examples of the color pigment include an organic pigment such as azo-based, phthalocyanine-based, anthraquinone-based, quinacridone-based, dioxazin-based, indigo-based, thioindigo-based, perylene-based, isoindolinone-based, and azomethine-based pigment, rhodamine B lake pigment, aniline black, and carbon black; and an inorganic pigment such as iron oxide, titanium oxide, calcium carbonate, barium sulfate, aluminum hydroxide, barium yellow pigment, iron blue pigment, cadmium red pigment, chrome yellow pigment, and metal powder.

Next, specific examples of the color pigments are recited.

-Yellow Pigment-

Examples of the pigment usable for a yellow ink composition include C. I. Pigment Yellow 1, C. I. Pigment Yellow 2, C. I. Pigment Yellow 3, C. I. Pigment Yellow 12, C. I. Pigment Yellow 13, C. I. Pigment Yellow 14, C. I. Pigment Yellow 16, C. I. Pigment Yellow 17, C. I. Pigment Yellow 73, C. I. Pigment Yellow 74, C. I. Pigment Yellow 75, C. I. Pigment Yellow 83, C. I. Pigment Yellow 93, C. I. Pigment Yellow 95, C. I. Pigment Yellow 97, C. I. Pigment Yellow 98, C. I. Pigment Yellow 114, is C. I. Pigment Yellow 128, C. I. Pigment Yellow 129, C. I. Pigment Yellow 151, and C. I. Pigment Yellow 154. The yellow pigment is not limited to any of these examples.

-Magenta Pigment-

Examples of the pigment used in a magenta ink composition include C. I. Pigment Red 5, C. I. Pigment Red 7, C. I. Pigment Red 12, C. I. Pigment Red 48 (Ca), C. I. Pigment Red 48 (Mn), C. I. Pigment Red 57 (Ca), C. I. Pigment Red 57:1, C. I. Pigment Red 112, C. I. Pigment Red 123, C. I. Pigment Red 168, C. I. Pigment Red 184, and C. I. Pigment Red 202. The magenta pigment is not limited to any of these examples.

-Cyan Pigment-

Examples of the pigment used in a cyan ink composition include C. I. Pigment Blue 1, C. I. Pigment Blue 2, C. I. Pigment Blue 3, C. I. Pigment Blue 15:3, C. I. Pigment Blue 15:34, C. I. Pigment Blue 16, C. I. Pigment Blue 22, C. I. Pigment Blue 60, C. I. Vat Blue 4, and C. I. Vat Blue 60. The cyan pigment is not limited to any of these examples.

The pigment to be contained in the ink composition used in the present invention may be a pigment which is newly produced for use in the present invention.

-Water-Dispersible Resin Particle-

The resin for use in the water-dispersible resin particles is not particularly limited and may be appropriately selected depending on the purpose. Examples thereof include urethane resin, polyester resin, acrylic resin, vinyl acetate resin, styrene resin, butadiene resin, styrene-butadiene resin, vinyl chloride resin, acryl styrene resin, acryl silicone resin, and fluorocarbon resin.

The water-dispersible resin particle is used, for example, as a form of a resin emulsion in which the resin particle is dispersed in water as a continuous phase. The resin emulsion may further contain a dispersant such as a surfactant, if necessary.

In the resin emulsion, the amount of the water-dispersible resin particles as a dispersing phase component is preferably 10% by mass to 60% by mass in general.

The diameter (volume-average particle diameter) of the water-dispersible resin particle is preferably 10 nm to 1,000 nm, more preferably 100 nm to 300 nm.

There is no significant difference between the particle diameter (volume-average particle diameter) of the resin emulsion and the water-dispersible resin particle (volume-average particle diameter). The larger the volume-average particle diameter, the more the resin emulsion can be added.

When the volume-average particle diameter is less than 100 nm, the addition amount of the emulsion cannot be increased in some cases. When the volume-average particle diameter is larger than 300 nm, the reliability of the ink composition is sometimes lowered. The above description on the scope of the volume-average particle diameter does not necessarily mean that a resin emulsion whose particle diameter falls outside the above-mentioned scope cannot be used. The above tendency generally applies to any type of emulsion.

The volume-average particle diameter can be measured, for example, using a particle size distribution measurement apparatus (MICROTRAC MODEL UPA9340, produced by Nikkiso Co., Ltd.).

The resin emulsion may properly be selected from a synthesized resin emulsion and a commercially available resin emulsion. Examples of the commercially available resin emulsion include MICROGEL E-1002 and E-5002 (styrene-acrylic resin emulsion; produced by Nippon Paint Co., Ltd.), BONCOAT 4001 (acrylic resin emulsion; produced by DIC Corporation), BONCOAT 5454 (styrene-acrylic resin emulsion; produced by DIC Corporation), SAE-1014 (styrene-acrylic resin emulsion; produced by Zeon Corporation), SAIBINOL SK-200 (acrylic resin emulsion; produced by Saiden Chemical Industry Co., Ltd.), PRIMAL AC-22 and AC-61 (acrylic resin emulsion; produced by Rohm and Haas Japan K. K.), NANOCRYL SBCX-2821 and 3689 (acryl silicone resin emulsion; produced by Toyo Ink Mfg. Co., Ltd.), and #3070 (methyl methacrylate polymer resin emulsion; produced by Mikuni Color Ltd.).

Of these, acryl silicone resin emulsion is preferable because of its good fixability.

The glass transition temperature of the resin component of the acryl silicone resin emulsion is preferably 25° C. or lower, more preferably 0° C. or lower. When the glass transition temperature is higher than 25° C., the resin itself is brittle, which is a main factor of degradation of fixability. However, it does not necessarily mean that the resin component having a glass transition temperature exceeding 25° C. cannot be used.

The glass transition temperature can be measured with, for example, a differential scanning calorimeter (produced by Rigaku Corporation).

Specifically, the glass transition temperature can be determined as follows: the temperature of a resin fragment of ambient temperature dried film of an aqueous resin emulsion is raised from about −50° C., and the temperature at which a step appears in the analysis curve is the glass transition temperature.

-Wetting Agent (High Boiling Point Water Soluble Organic Solvent)-

The wetting agent may be appropriately selected depending on the purpose. Examples thereof include polyhydric alcohols, polyhydric alcohol alkyl ethers, polyhydric alcohol aryl ethers, nitrogen-containing heterocyclic compounds, amides, amines, sulfur-containing compounds, propylene carbonate, and ethylene carbonate. These wetting agents may be used singly or in combination of two or more. Examples of the polyhydric alcohols include ethylene glycol, diethylene glycol, triethylene glycol, polyethylene glycol, propylene glycol, dipropylene glycol, tripropylene glycol, polypropylene glycol, 1,3-propane diol, 1,3-butane diol, 2,3-butane diol, 1,4-butane diol, 3-methyl-1,3-butane diol, 1,5-pentane diol, 1,6-hexane diol, 2-methyl-2,4-pentane diol, tetraethylene glycol, polyethylene glycol, glycerine, 1,2,6-hexane triol, 1,2,4-butane triol, 1,2,3-butane triol, and petriol.

Examples of the polyhydric alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of the polyhydric alcohol aryl ethers include ethylene glycol monophenyl ether, and ethylene glycol monobenzyl ether.

Examples of the nitrogen-containing heterocyclic compounds include N-methyl-2-pyrrolidone, N-hydroxyethyl-2-pyrrolidone, 2-pyrrolidone, 1,3-dimethylimidazolidinone, and ϵ-caprolactam.

Examples of the amides include formamide, N-methylformamide, and N,N-dimethylformamide.

Examples of the amines include monoethanol amine, diethanol amine, triethanol amine, monoethyl amine, diethyl amine, and triethyl amine.

Examples of the sulfur-containing compounds include dimethyl sulfoxide, sulfolane, thiodiethanol, and thiodiglycol.

Of these, in terms of ink ejection stability, it is preferable to use glycerine, 2-pyrrolidone, diethylene glycol, thiodiethanol, polyethylene glycol, triethylene glycol, 1,2,6-hexanetriol, 1,2,4-butane triol, petriol, 1,5-pentanediol, N-methyl-2-pyrrolidone, 1,3-butanediol, and 3-methyl-1,3-butanediol, with glycerine, 1,3-butanediol, 3-methyl-1,3-butanediol, and 2-pyrrolidone being more preferable.

-Surfactant-

The surfactant is not particularly limited and may be appropriately selected depending on the purpose from those which do not impair the dispersion stability when combined with the colorant, wetting agent and penetrant for use. When the printing is performed onto a paper having poor water absorption property, it is preferable to use those having low surface tension and high leveling property, selected from at least one of silicone-based surfactants and fluorine-based surfactants. Of these, fluorine-based surfactants are more preferable.

The fluorine-based surfactant may be a surfactant having an organic group whose 2 to 16 carbon atoms have fluorine atoms, more preferably a surfactant having an organic group whose 4 to 16 carbon atoms have fluorine atoms. If the number of the carbon having a fluorine atom is less than 2, the effect of fluorine cannot be obtained in some cases. If the number of the carbon having a fluorine atom is more than 16, ink stability tends to degrade.

Examples of the fluorine-based surfactants include a perfluoroalkyl sulfonic acid compound, a perfluoroalkylcarboxylic acid-based compound, a perfluoroalkylphosphate ester compound, a perfluoroalkylethylene oxide adduct, and a polyoxyalkylene ether polymer compound having at the side chain a perfluoroalkylether group. Of these, a polyoxyalkylene ether polymer compound having at the side chain a perfluoroalkylether group is more preferable since it is less foamable.

Examples of the perfluoroalkylsulfonic acid compound include a perfluoroalkylsulfonic acid and a perfluoroalkylsulfonic acid salt.

Examples of the perfluoroalkylcarboxylic acid-based compound include perfluoroalkyl carboxylic acid and perfluoroalkylcarboxylic acid salt.

Examples of the perfluoroalkylphosphoric acid ester compound include perfluoroalkylphosphoric acid ester and perfluoroalkylphosphoric acid ester salt.

Examples of the polyoxyalkylene ether polymer compound having at the side chain a perfluoroalkyl ether group include a polyoxyalkylene ether polymer having at the side chain a perfluoroalkyl ether group, a sulfate of polyoxyalkylene ether polymer having at the side chain a perfluoroalkyl ether group, and a salt of polyoxyalkylene ether polymer having at the side chain a perfluoroalkyl ether group.

Examples of a counter ion of the salt of the fluorine-based surfactant include Li, Na, K, $NH_4$, $NH_3CH_2CH_2OH$, $NH_2(CH_2CH_2OH)_2$, and $NH(CH_2CH_2OH)_3$.

The fluorine-based surfactant may be either a synthesized one or a commercially available one.

Examples of the commercially available fluorine-based surfactant include SURFLON S-111, S-112, S-113, S-121, S-131, S-132, S-141, and S-145 (all produced by Asahi Glass Co., Ltd.), FLUORAD FC-93, FC-95, FC-98, FC-129, FC-135, FC-170C, FC-430, and FC-431 (all produced by Sumitomo 3M Ltd.), MEGAFAC F-470, F1405, and F-474 (all produced by DIC Corporation), ZONYL TBS, FSP, FSA, FSN-100, FSN, FSO-100, FSO, FS-300, and UR (all produced by Dupont Kabushiki Kaisha), FT-110, FT-250, FT-251, FT-400S, FT-150, and FT-400SW (all produced by Neos Co., Ltd.), and PF-151N (produced by Omnova Solutions, Inc.). Of these, in terms of good printing quality, and markedly enhanced coloring property and level dyeing property to paper, FT-110, FT-250, FT-251,FT-400S, FT-150, FT-400SW (produced by Neos Corporation) and PF-151N (produced by Omnova Solutions, Inc.) are more preferable.

The silicone-based surfactant is not particularly limited and may be properly selected depending on the purpose. Preferable is the silicone-based surfactant that is not decomposed even at a high pH condition. Examples thereof include a side chain modified polydimethyl siloxane, a both terminal modified polydimethyl siloxane, a one terminal modified polydimethyl siloxane, and a side chain and both terminal modified polydimethyl siloxane. The modified group is preferably a polyoxyethylene group, or polyoxyethylene polyoxypropylene group due to their excellent property as an aqueous surfactant.

Such a surfactant may properly be selected from synthesized products or commercially available products.

The commercially available product is, for example, easily available from BYK Japan K K, Shin-Etsu Silicones, or Dow Corning Toray Silicone.

The polyether modified silicone-based surfactant is not particularly limited and may be appropriately selected depending on the purpose. Examples thereof include a compound formed by introducing a polyalkylene oxide structure to Si portion side chain of dimethylpolysiloxane.

The polyether modified silicone compound may be a commercially available compound such as KF-618, KF-642, or KF643 (all, Shin-Etsu Chemical Co., Ltd.)

Other than the fluorine-based surfactant and silicone-based surfactant, any of an anionic surfactant, a nonionic surfactant and an amphoteric surfactant may be used.

The ink may further contain a penetrant, a pH regulator, an antiseptic-fungicide, and antifoam, depending on the purpose.

[Inkjet Recording Apparatus and Inkjet Recording Method]

The inkjet recording apparatus of the present invention at least includes an ejecting unit configured to apply a stimulus to an ink composition so as to eject the ink composition to form an image on the recording medium, wherein the ink composition contains at least one of a pigment/water-dispersible resin particle mixture in which a pigment is dispersed along with water-dispersible resin particles and colored water-dispersible resin particles each of which is a water-dispersible resin particle which is colored.

The inkjet recording apparatus of the present invention may further include other units such as a stimulus generating unit and a control unit, where appropriate.

The inkjet recording method of the present invention includes (i) exposing a surface of a recording medium to non-thermal atmospheric pressure plasma so as to hydrophilize the surface of the recording medium, and (ii) applying a stimulus to an ink composition so as to eject the ink composition to form an image on the recording medium, wherein the ink composition contains at least one of a pigment/water-dispersible resin particle mixture in which a pigment is dispersed along with water-dispersible resin particles and colored water-dispersible resin particles each of which is a water-dispersible resin particle which is colored.

The inkjet recording method of the present invention may further include other steps such as a stimulus generating step and a control step.

The inkjet recording method of the present invention can suitably be performed by the inkjet recording apparatus of the present invention, and the hydrophilizing step can suitably be performed by the hydrophilizing unit, and the ink ejecting step can suitably be performed by ink ejecting unit.

-Hydrophilizing Step and Hydrophilizing Unit-

The hydrophilizing step is exposing a surface of a recording medium to non-thermal atmospheric pressure plasma so as to hydrophilize the surface of the recording medium.

The hydrophilizing unit is a unit configured to expose a surface of a recording medium to non-thermal atmospheric pressure plasma so as to hydrophilize the surface of the recording medium.

The hydrophilizing with non-thermal atmospheric pressure plasma is a preferable method because temperature of electrons is extremely high and temperature of the gas is approximately an ordinary temperature.

The method for generating non-thermal atmospheric pressure plasma is roughly divided into a dielectric barrier discharge in which an insulator such as a dielectric substance is inserted between electrodes, a corona discharge in which a marked unequal electric field is formed on a metal wire or the like, and a pulse discharge in which a short pulse voltage is applied.

These methods may be used solely or in combination thereof. In order to stably generate the non-thermal atmospheric pressure plasma at a broad range, it is very preferable to adopt a dielectric barrier discharge in the form of a streamer dielectric breakdown obtained by applying an alternating high voltage between the electrodes covered with dielectric substance.

As another embodiment, a discharge plasma obtained by ionizing atmospheric gas with discharge may be used the hydrophilization.

Figure 1:
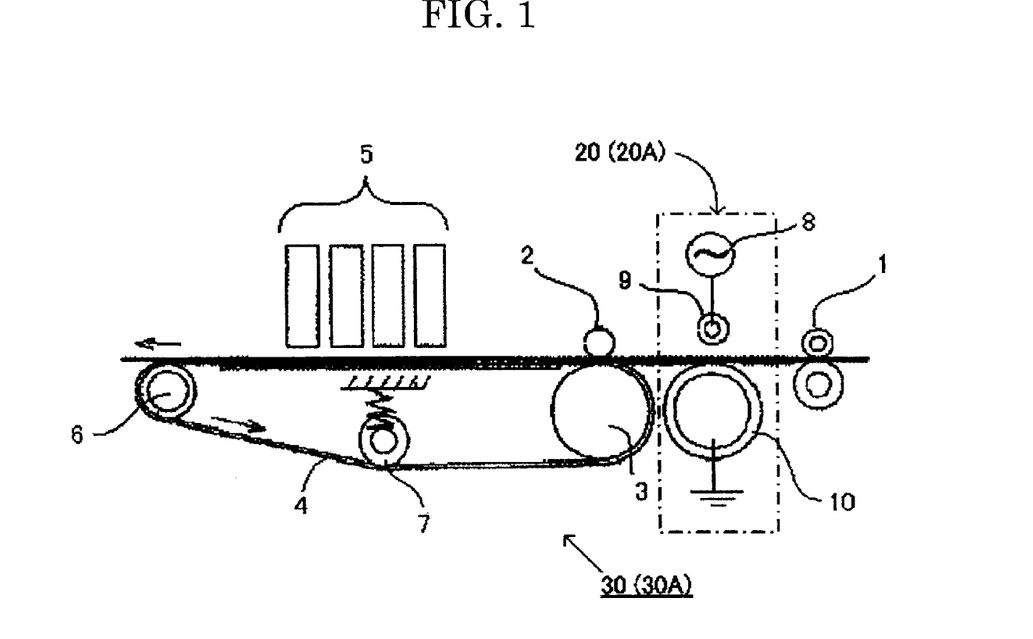
FIG. 1 is an explanatory diagram showing outline of one example of the inkjet recording apparatus equipped with a hydrophilizing unit.

FIG. 1 is an explanatory diagram showing outline of one embodiment of the inkjet recording apparatus equipped with a hydrophilizing unit.

As shown in FIG. 1, the inkjet recording apparatus 30 (30A) includes a hydrophilizing unit 20 (20A). The hydrophilizing unit 20 (20A) includes a discharge electrode (non-contact discharge electrode) 9 covered with a dielectric material and an earth electrode 10 covered with a dielectric material. The discharge electrode 9 is connected to a high-frequency power source 8. There is a clearance between the discharge electrode 9 and the earth electrode 10.

A recording paper (recording medium) conveyed with a conveyer roller 1 passes between the discharge electrode 9 and the earth electrode 10. The hydrophilization is carried out between the discharge electrode 9 and the earth electrode 10. The recording paper having passed between them is conveyed by a conveyer belt 4.

At the internal circumference side of the ring-shaped conveyer belt 4, a driven roller 3, a driving roller 6, and a tension roller 7 are disposed. These rollers control the driving of the conveyer belt 4 and the like.

While the conveyer belt 4 conveys the hydrophilized recording paper, an ink composition is jetted from an inkjet head 5 (inkjet unit), thereby forming an image on the recording paper. The numeral 2 is a resist roller.

Figure 2:
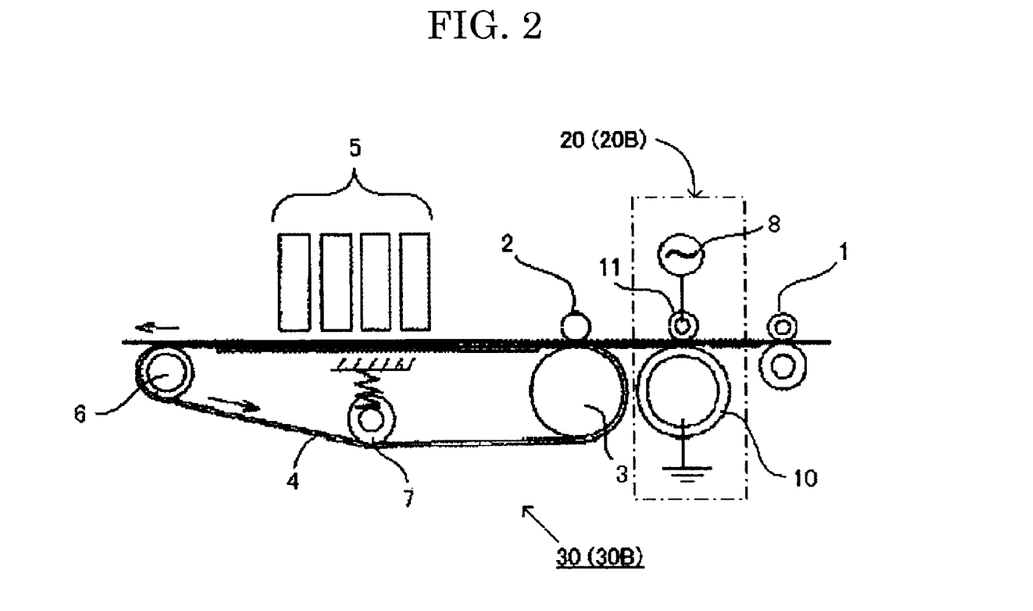
FIG. 2 is an explanatory diagram showing outline of one example of the inkjet recording apparatus equipped with another hydrophilizing unit.

FIG. 2 is an explanatory diagram showing an outline of an inkjet recording apparatus of one embodiment having another hydrophilizing unit.

As shown in FIG. 2, the inkjet recording apparatus 30 (30B) includes a hydrophilizing unit 20 (20B). The hydrophilizing unit 20 (20B) includes a contact roller discharge electrode 11 covered with a dielectric material and an earth electrode 10. The discharge electrode 11 is connected to a high-frequency power source 8. The contact roller discharge electrode 11 is disposed so as to be in contact with the earth electrode 10.

The recording paper (recording medium) conveyed with a conveyer roller 1 passes between the contact roller discharge electrode 11 and the earth electrode 10 by being nipped with the contact roller discharge electrode 11 and the earth electrode 10. While passing through the rollers, the recording paper is hydrophilized.

The structure other than the hydrophilizing unit 20 (20B) is the same as in the inkjet recording apparatus 30 (30A) in FIG. 1.

As the high-frequency power source 8, for example, CT-0212 produced by Kasuga Electric Works Ltd. may be used. As the contact roller discharge electrode 11 to be connected to the high-frequency power source 8, for example, a stainless steel roller covered with a dielectric material of 300 mm long may be used. The contact roller discharge electrode 11 is disposed perpendicular to the direction of conveying the recording paper. Non-thermal atmospheric pressure plasma of applied power of 200 W is generated in a condition that a primary voltage of an oscillator in the high-frequency power source 8 is 60 V and a primary electric current is 3.4 A. The conveying speed of the recording paper is, for example, set as 1,000 mm/sec. The plasma irradiation energy density on the recording paper is about 67 J/cm$^2$.

The applied electric power is preferably 100 W to 300 W, more preferably 150 W to 250 W. When the applied electric power is lower than 100 W (33.3 mJ/cm$^2$), the plasma does not uniformly generate, so that the recording paper tends to be incapable of being hydrophilized uniformly over the whole surface. Meanwhile, when the applied electric power is higher than 300 W (100 mJ/cm$^2$), although the hydrophilization of the recording paper is possible, the effect of hydrophilization is saturated so that electric power efficiency tends to be lowered.

A voltage applying method, a structure of the electrode, and a method for conveying the recording paper are not particularly limited and may be appropriately selected depending on the purpose, provided that non-thermal atmospheric pressure plasma can be stably generated necessary for hydrophilizing the surface of the recording medium.

The hydrophilizing unit is disposed, for example, at a position between the paper feed device (e.g., the conveying roller 1) and the inkjet head 5. The thus disposed hydrophilizing unit can hydrophilize the recording medium successively.

The ink jetting unit may be mounted at any position so long as the recording medium is hydrophilized before inkjet printing is performed by an ink ejecting unit.

When performing a duplex printing, hydrophilization of at least one surface of the recording medium by a hydrophilizing unit is enough. In the case where the recording medium is reversed and passed again through the plasma electrode portion, discharge may be stopped.

The recording medium after the back is printed is released to a release paper tray. In the recording media piled on the release paper tray, it is possible that undried ink on the surface of the recording medium transfers to the back or the like of another recording medium. To avoid such transfer of undried ink, it is preferable to carry out hydrophilization without stopping discharging even when the back surface is printed.

Furthermore, the hydrophilization technique of the present invention can be applied to a roll paper printing, which is the same in a raw material with the recording medium such as paper.

In a roll paper printing in which the paper after performing an ink printing is immediately wound up, the hydrophilization according to the above method can accelerate the drying speed.

Irrespective to intermittent action or continuous action of plasma, the electric discharge in an atmosphere generates an ozone gas. Thus it is preferable for the inkjet recording apparatus to have a fan and a route to expel the air around the discharge electrode to outside the apparatus (outside the room).

In addition, it is preferable that before expelling the ozone gas to outside, ozone gas is removed with an ozone gas decomposition filter such as manganese dioxide and an activated carbon.

The amount of ozone generated is low in a discharge electrode roller method in which discharge generating space is small. In order to reduce the concentration of oxygen as a raw substance of ozone in the atmosphere, it is preferable to replace the air present near the discharge electrode with an inert gas such as nitrogen.

-Ink Ejecting Step and Ink Ejecting Unit-

The ink ejecting step is applying a stimulus to an ink composition so as to eject the ink composition to form an image on the recording medium.

The ink ejecting unit is a unit configured to apply a stimulus to an ink composition so as to eject the ink composition to form an image on the recording medium. The ink ejecting unit is not particularly limited and the example thereof includes various nozzles for ink ejection.

In the present invention, it is preferable that at least one portion of the liquid room portion, fluid resistance portion, vibration plate, and nozzle member of the inkjet head is formed with a material containing at least one of Si and Ni.

The diameter of the inkjet nozzle is preferably 30 μm or less, more preferably 1 μm to 20 μm.

It is preferable to take a structure in which a subtank to provide ink is disposed on the inkjet head such that ink is supplemented from an ink cartridge through an ink supply tube.

The stimulus can be generated by the stimulus generating unit. The stimulus is not particularly limited and may be appropriately selected from heat (temperature), pressure, vibration, and light. These stimuli may be used solely or in combination of two or more. Of these, heat and pressure is preferable.

Examples of the stimulus generating unit include a heating unit, a pressure unit, a piezoelectric element, a vibration generator, an ultrasonic oscillator, and light. More specific examples thereof include a piezoelectric actuator such as a piezoelectric element; a thermal actuator utilizing a phase change due to a film boiling of liquid using a thermoelectric conversion element such as heat element; a shape-memory alloy actuator utilizing metal phase change due to temperature change; an electrostatic actuator using an electrostatic power.

Aspect of ejecting of the recording ink is not particularly limited but varies according to the type of stimulus. For example, in the case where the stimulus is heat, a thermal energy corresponding to a recording signal is added to the recording ink in the recording head using, for example, a thermal head, resulting in the generation of air bubbles in the recording ink by the thermal energy, followed by ejecting the recording ink as liquid drops from the nozzle of the recording head by the pressure of the air bubbles. In the case where the stimulus is a pressure, by applying a voltage to a piezoelectric element which is caused to adhere to the position called a pressure room present in an ink flow path in the recording head, the piezoelectric element is bent so that the volume of the pressure room is reduced, to thereby ejecting the recording ink as liquid drops from the nozzle of the recording head.

The recording ink to be filed preferably has a liquid drop of, for example, 2 pL to 40 pL in size, preferably has an ejection speed of 6 m/s to 20 m/s. Its preferable drive frequency is 1 kHz or more, and the preferable resolution is 300 dpi or more.

It is preferable to eject the ink to a printing region or a non-printing region before the water evaporation in the vicinity of nozzle exceeds 30%.

The control unit is not particularly limited so far as it can control the motion of the units, and may appropriately be selected depending on the purpose. Examples thereof include apparatuses such as a sequencer and a computer.

[Inkjet Recorded Material]

The inkjet recorded material of the present invention is the inkjet recorded material recorded on the recording medium hydrophilized according to the inkjet recording apparatus and the inkjet recording method of the present invention.

EXAMPLES

The present invention will be explained in more detail with reference to Examples. The present invention is not at all limited by the Examples.

Production Example 1

-Preparation of Surface Treated Black Pigment Dispersion-

To 3,000 mL of 2.5 N sodium sulfate solution, 90 g of a carbon black having a CTAB specific surface area of 150 m$^2$/g and a DBP oil absorbing amount of 100 mL/100 g was added, and the mixture was stirred for 10 hours at 60° C. and at 300 rpm for oxidation.

Thereafter, the reaction mixture was filtered and the obtained carbon black was neutralized with sodium hydroxide solution, followed by ultrafiltration. The resultant carbon black was washed with water and dried, and dispersed into pure water such that a solid content is 20% by mass, whereby the black pigment dispersion of Production Example 1 was yielded.

Production Example 2

-Preparation of Polymer Solution A-

In a 1L flask equipped with a mechanical stirrer, thermometer, nitrogen gas-introducing tube, reflux tube, and dropping funnel, nitrogen gas was passed thoroughly, and then styrene (11.2 g), acrylic acid (2.8 g), laurylmethacrylate (12.0 g), polyethylene glycol methacrylate (4.0 g), styrene macromer (AS-6, produced by Toagosei Co., Ltd.) (4.0 g), and mercaptoethanol (0.4 g) were mixed in the flask, and the mixture was heated to 65° C.

Then, into the flask, a mixed solution of styrene (100.8 g), acrylic acid (25.2 g), laurylmethacrylate (108.0 g), polyethylene glycol methacrylate (36.0 g), hydroxyethylmethacrylate (60.0 g), styrene macromer (AS-6, produced by Toagosei Co., Ltd.) (36.0 g), mercaptoethanol (3.6 g), azo bismethyl valeronitrile (2.4 g), and methyl ethyl ketone (18 g) was dropped for 2.5 hours.

After completion of the dropping, a mixed solution of azo bismethyl valeronitrile (0.8 g) and methyl ethyl ketone (18 g) was dropped into the flask for 0.5 hour. After allowing the mixture to age for 1 hour at 65° C., azo bismethyl valeronitrile (0.8 g) was added to the mixture, and the resultant mixture was further allowed to age for 1 hour. After completion of the reaction, methyl ethyl ketone (364 g) was added to the flask, whereby a polymer solution A (800 g) having a concentration of 50% by mass was prepared.

-Preparation of Dimethyl Quinacridone Pigment-Containing Polymer Fine Particle Water Dispersion- Subsequently, the obtained polymer solution A (28 g), C. I. pigment red 122 (42 g), 1 mol/L aqueous potassium hydroxide solution (13.6 g), methyl ethyl ketone (20 g), and an ion exchange water (13.6 g) were mixed and thoroughly stirred, and then the mixture was kneaded with a roll mill. The obtained paste was put into pure water (200 g), and the resultant mixture was fully stirred, and methyl ethyl ketone and water were removed by using an evaporator, whereby the water dispersion of magenta polymer fine particles of Production Example 2 containing pigment (15% by mass) and solid (20% by mass) was yielded.

Production Example 3

-Preparation of Copper Phthalocyanine Pigment-Containing Polymer Fine Particle Dispersion- A water dispersion of a cyan polymer fine particle was prepared in the same manner as in the Production Example 2 except that C. I. Pigment Red 122 was changed to copper phthalocyanine, and pigment content and solid content were changed to 12% by mass and 20% by mass, respectively.

Production Example 4

-Preparation of Monoazo Yellow Pigment-Containing Polymer Fine Particle Dispersion- A water dispersion of a yellow polymer fine particle was prepared in the same manner as in Production Example 2 except that C. I. Pigment Red 122 was changed to C. I. Pigment Yellow 74, and pigment content and solid content were changed to 12% by mass and 20% by mass, respectively.

Production Example 5

-Preparation of Polymer Fine Particle Dispersion B (Acryl-Silicone Emulsion)-

In a 1 L flask equipped with a mechanical stirrer, thermometer, nitrogen gas-introducing tube, reflux tube, and dropping funnel, nitrogen gas was passed thoroughly, and then LATEMUL S-180 (8.0 g) and ionic exchange water (350 g) were added and mixed, and the mixture was heated to 65° C. After heating, t-butylperoxobenzoate (3.0 g) (an initiating agent) and sodium isoascorbate (1.0 g) were added thereto. 5 minutes thereafter, methyl methacrylate (45 g), 2-ethylhexyl methacrylate (160 g), acrylic acid (5 g), butyl methacrylate (45 g), cyclohexyl methacrylate (30 g), vinyl ethoxy silane (15 g), LATEMUL S-180 (8.0 g), and ion exchange water (340 g) were mixed, followed by dropping for 3 hours. Then, the resultant mixture was heated and aged for 2 hours at 80° C., and then was cooled to ordinary temperature, and the pH thereof was adjusted to 7 to 8 with sodium hydroxide. Ethanol was removed by an evaporator, and water content was controlled, to thereby yield the polymer dispersion B (730 g) of Production Example 5 having a solid content of 40% by mass. The particle diameter of the resin fine particle was about 130 nm (measured at 23° C.). The particle diameter was measured with a particle size distribution analyzer MICROTRAC UPA 150 (produced by Nikkiso Co., Ltd.) at a 500-fold dilution.

(Ink Composition 1)

-Black Pigment Ink-

An ink composition 1 containing the following components was prepared.

| | |
|---|---|
| black pigment dispersion of Production Example 1 | 38% by mass |
| 1,3-butanediol | 19.5% by mass |
| glycerine | 6% by mass |
| 2-ethyl-1,3-hexanediol | 1% by mass |
| fluorine-based surfactant (FS-300, produced by Dupont Kabushiki Kaisha Kabushiki Kaisha) | 2% by mass |
| antiseptic-fungicide (PROXEL LV, produced by Zeneca Ltd.) | 0.05% by mass |
| amine-based pH regulator 2-amino-2-ethyl-1,3-propanediol) | 0.6% by mass |
| silicone-based antifoam (KF-618, produced by Shin-Etsu Chemical Co., Ltd.) | 0.1% by mass |
| water | balance |

(Ink Composition 2)

-Black Pigment Ink-Containing Polymer Dispersion-

Ink composition 2 containing the following components was prepared.

| | |
|---|---|
| black pigment dispersion of Production Example 1 | 38% by mass |
| polymer dispersion B of Production Example 5 | 36% by mass |
| 1,3-butanediol | 19.5% by mass |
| glycerine | 6% by mass |
| 2-ethyl-1,3-hexanediol | 1% by mass |
| fluorine-based surfactant (FS-300, produced by Dupont Kabushiki Kaisha) | 2% by mass |
| antiseptic-fungicide (PROXEL V, produced by Zeneca Ltd.) | 0.05% by mass |
| amine-based pH regulator (2-amino-2-ethyl-1.3-propanediol) | 0.6% by mass |
| silicone-based antifoam (KF-618, produced by Shin-etsu Chemical Co., Ltd.) | 0.1% by mass |
| water | balance |

(Ink Composition 3)

-Polymer Dispersion-Containing Magenta Polymer Ink-

| | |
|---|---|
| Magenta polymer fine particle dispersion of Production Example 2 | 38% by mass |
| polymer dispersion B of Production Example 5 | 36% by mass |
| 1,3-butanediol | 19.5% by mass |

-continued

| | |
|---|---|
| glycerine | 6% by mass |
| 2-ethyl-1,3-hexanediol | 1% by mass |
| fluorine-based surfactant (FS-300, produced by Dupont Kabushiki Kaisha) | 2% by mass |
| antiseptic-fungicide (PROXEL LV, produced by Zeneca Ltd.) | 0.05% by mass |
| amine-based pH regulator (2-amino-2-ethyl-1,3-propanediol) | 0.6% by mass |
| silicone-based antifoam (KF-618, produced by Shin-Etsu Chemical Co., Ltd.) | 0.1% by mass |
| water | balance |

(Ink Composition 4)
-Polymer Dispersion-Containing Cyan Polymer Ink-

Ink composition 4 was prepared in the same manner as in ink composition 3 except that magenta polymer fine particle dispersion of ink composition 3 was changed to the cyan polymer fine particle dispersion of Production Example 3.

(Ink Composition 5)
-Polymer Dispersion-Containing Yellow Polymer Ink-

Ink composition 5 was prepared in the same manner as in ink composition 3 except that the magenta polymer fine particle dispersion of ink composition 3 was changed to the yellow polymer fine particle dispersion of Production Example 4.

(Evaluation Method)

As an image recording medium, Ricoh PPC paper TYPE 6200 (produced by NBS Ricoh Co., Ltd.) having a Stockigt sizing degree of 14 sec. was used. At a paper conveying speed of 1,000 mm/sec, for each of the ink composition, inkjet printing at resolution of 600 dpi was performed and a degree of dryness and image quality immediately after the printing were observed. The environmental conditions for the test were: 23° C., and humidity 50%.

As for the hydrophilization of the paper before printing was conducted using a high-frequency power source CT-0212 (produced by Kasuga Electric Works Ltd.). With the use of the non-contact discharge electrode as shown in FIG. 1 or the contact roller discharge electrode as shown in FIG. 2, non-thermal atmospheric pressure plasma of applied power of 200 W was generated.

The inkjet printing was carried out using a head of an inkjet printer G-707 (produced by Ricoh Company, Ltd.) by printing a solid image of 1 cm square. The ink amount attached was about 6.5 g/m².

The degree of dryness of the printed image immediately after printing was confirmed by the amount of ink transferred onto the filter paper 5A (produced by Advantec MFS. Inc.) when the filter paper was pressed on the image immediately after printing (this is called a filter paper sticking drying test).

The image quality was confirmed by measuring the printing image density with a Macbeth densitometer.

In addition, the edge of the image was observed by visual inspection to confirm the condition of feathering.

Examples 1 to 4 and Comparative Example 1

The hydrophilization of the paper before printing was carried out by using the non-contact discharge electrode 9 as seen in FIG. 1, and subsequently each ink composition as shown in Table 1 was used for inkjet printing of the hydrophilized paper.

The results of filter paper sticking drying test, image density, image feathering, and overall evaluation in the Examples 1 to 4 and Comparative Example 1 are summarized in Table 1.

Examples 5 to 8 and Comparative Example 2

The hydrophilization of the paper before printing was carried out by using the contact roller discharge electrode 11 as seen in FIG. 2, and subsequently each ink composition as shown in Table 1 was used for inkjet printing of the hydrophilized paper.

The results of filter paper sticking drying test, image density, image feathering, and overall evaluation in the Examples 5 to 8 and Comparative Example 2 are summarized in Table 1.

Examples 9 to 12 and Comparative Example 3

The hydrophilization of the paper before printing was carried out by using the non-contact discharge electrode 9 as seen in FIG. 1, and the hydrophilized paper was left to stand for 10 seconds, then each ink composition as shown in Table 1 was used for inkjet printing of the hydrophilized paper.

The results of filter paper sticking drying test, image density, image feathering, and overall evaluation in the Examples 9 to 12 and Comparative Example 3 are summarized in Table 1.

Examples 13 to 16 and Comparative Example 4

The hydrophilization of the paper before printing was carried out by using the contact roller discharge electrode 11 as seen in FIG. 2, and the hydrophilized paper was left to stand for 10 seconds, then each ink composition as shown in Table 1 was used for inkjet printing of the hydrophilized paper.

The results of filter paper sticking drying test, image density, image feathering, and overall evaluation in the Examples 13 to 16 and Comparative Example 4 are summarized in Table 1.

Comparative Examples 5 to 9

To non-hydrophilized papers, inkjet printing was carried out by using the ink compositions as shown in Table 1.

The results of filter paper sticking drying test, image density, image feathering, and overall evaluation in the Comparative Examples 5 to 9 are summarized in Table 1.

TABLE 1

| | Ink composition | Filter paper sticking drying test | Image density | Feathering | Overall evaluation |
|---|---|---|---|---|---|
| Comparative Example 1 | 1 | No transfer | 1.27 | Marked | D |
| Example 1 | 2 | No transfer | 1.31 | None | A |
| Example 2 | 3 | No transfer | 1.32 | None | A |
| Example 3 | 4 | No transfer | 1.30 | None | A |
| Example 4 | 5 | No transfer | 1.29 | None | A |
| Comparative Example 2 | 1 | No transfer | 1.28 | Marked | D |
| Example 5 | 2 | No transfer | 1.31 | None | A |
| Example 6 | 3 | No transfer | 1.33 | None | A |
| Example 7 | 4 | No transfer | 1.30 | None | A |
| Example 8 | 5 | No transfer | 1.30 | None | A |
| Comparative Example 3 | 1 | Slight transfer | 1.25 | Found | D |
| Example 9 | 2 | No transfer | 1.27 | None | B |
| Example 10 | 3 | No transfer | 1.27 | None | B |
| Example 11 | 4 | No transfer | 1.26 | None | B |
| Example 12 | 5 | No transfer | 1.27 | None | B |
| Comparative Example 4 | 1 | Slight transfer | 1.26 | Found | D |
| Example 13 | 2 | No transfer | 1.28 | None | B |
| Example 14 | 3 | No transfer | 1.27 | None | B |

TABLE 1-continued

| | Ink composition | Filter paper sticking drying test | Image density | Feathering | Overall evaluation |
|---|---|---|---|---|---|
| Example 15 | 4 | No transfer | 1.28 | None | B |
| Example 16 | 5 | No transfer | 1.27 | None | B |
| Comparative Example 5 | 1 | a little transfer | 1.22 | Found | D |
| Comparative Example 6 | 2 | a little transfer | 1.25 | None | C |
| Comparative Example 7 | 3 | a little transfer | 1.25 | None | C |
| Comparative Example 8 | 4 | a little transfer | 1.24 | None | C |
| Comparative Example 9 | 5 | a little transfer | 1.24 | None | C |

(Criteria for Overall Evaluation)

The criteria for overall evaluation in Table 1 are as follows:

A: no transfer was observed in the filter paper sticking drying test, image density was 1.29 or more, and no feathering was observed.

B: no transfer was observed in the filter paper sticking drying test, image density was 1.26 to 1.29, and no feathering was observed.

C: a little transfer was observed in the filter paper sticking drying test, image density was 1.24 to 1.26, and no feathering was observed.

D: Feathering was observed.

From the data in Table 1, it was confirmed that in Examples 1 to 16 in which the recording medium was hydrophilized, the drying speed of the printed image was increased and the image density was enhanced, compared to those of Comparative Examples 6 to 8.

The main cause for the excellent drying speed and excellent drying property is considered to be an increase of the ink penetration speed in the drying mechanism of an inkjet ink (ink composition), which is generally called as a penetration drying. Specifically, it is considered that the hydrophilization performed before printing improved the wettability of the surface of paper fiber as a recording medium, resulting in the increase of ink penetration speed.

Comparative Examples 1 to 4 represent the case where a colorant is used in the absence of a pigment/water-dispersible resin particle mixture and a colored water-dispersible resin particle. It was confirmed from the Comparative Examples 1 to 4 that when the ink composition containing the colorant was printed on the recording medium whose surface was hydrophilized, ink penetration toward the lateral direction (the direction vertical to the conveying direction) occurred markedly, which caused the feathering of image.

In contrast thereto, each of the ink compositions of Examples 1 to 16 contains the pigment/water-dispersible resin particles mixture and the colored water-dispersible resin particles as a colorant. Hence, it is considered that when the ink penetrates the paper fibers of the recording medium, only the solvent of the ink immediately penetrates into the recording medium and the colorants agglomerate so that the flow of the colorants, which causes the feathering, are inhibited.

The flow-inhibited colorants do not penetrate deep into the recording medium and stay on the surface, resulting in the high image density without causing the strike-through.

In addition, from the results of Examples 1 to 4, and 9 to 12, and Examples 5 to 8, and 13 to 16, it was confirmed that since the hydrophilizing step and the printing step (ink ejecting step) were performed successively, the ink could be quickly dried and high image quality could be obtained.

It was also confirmed from Examples 1 to 8 that there was no transfer in the filter paper sticking drying test and no image feathering, and image density equal to that of electrophotography was obtained.

What is claimed is:

1. An inkjet recording method comprising:
   (i) exposing a surface of a recording medium to non-thermal atmospheric pressure plasma so as to hydrophilize the surface of the recording medium, and
   (ii) applying a stimulus to an ink composition so as to eject the ink composition to form an image on the recording medium,
   wherein (i) and (ii) are successively performed, and
   wherein the ink composition comprises at least one of a pigment/water-dispersible resin particle mixture in which a pigment is dispersed along with water-dispersible resin particles and colored water-dispersible resin particles each of which is a water-dispersible resin particle which is colored.

2. The inkjet recording method according to claim 1, wherein (ii) is performed within 10 seconds after performing (i).

3. The inkjet recording method according to claim 1, wherein the water-dispersible resin particles comprise an acryl silicone resin.

4. An inkjet recording apparatus comprising:
   a hydrophilizing unit configured to expose a surface of a recording medium to non-thermal atmospheric pressure plasma so as to hydrophilize the surface of the recording medium,
   an ejecting unit configured to apply a stimulus to an ink composition so as to eject the ink composition to form an image on the recording medium,
   wherein said apparatus is configured such that said hydrophilizing unit and said ejecting unit are arranged such that said exposing and said applying are successively performed, and
   wherein the ink composition comprises at least one of a pigment/water-dispersible resin particle mixture in which a pigment is dispersed along with water-dispersible resin particles and colored water-dispersible resin particles each of which is a water-dispersible resin particle which is colored.

5. The inkjet recording apparatus according to claim 4, wherein said applying is performed within 10 seconds after performing said exposing.

6. The inkjet recording apparatus according to claim 4, wherein the water-dispersible resin particles comprise an acryl silicone resin.

* * * * *

UNITED STATES PATENT AND TRADEMARK OFFICE
CERTIFICATE OF CORRECTION

PATENT NO. : 8,186,823 B2
APPLICATION NO. : 12/468437
DATED : May 29, 2012
INVENTOR(S) : Haruki Saitoh et al.

It is certified that error appears in the above-identified patent and that said Letters Patent is hereby corrected as shown below:

Column 5, line 31, "114, is C.I." should read --114, C.I.--.

Signed and Sealed this
Twenty-eighth Day of August, 2012

David J. Kappos
*Director of the United States Patent and Trademark Office*